3,032,599
SULFATE-TREATED ZIRCONIA-GEL CATALYST
Vernon C. F. Holm and Grant C. Bailey, Bartlesville, Okla., assignors to Phillips Petroleum Company, a corporation of Delaware
No Drawing. Filed May 5, 1958, Ser. No. 732,825
5 Claims. (Cl. 260—683.64)

This invention relates to sulfate-treated catalysts for use in the conversion of hydrocarbon. In one aspect the invention relates to the use of zirconia-gel catalyst treated with sulfate in the isomerization and alkylation of hydrocarbons.

It is an object of this invention to provide an improved process for the conversion of hydrocarbons.

Another object of the invention is to provide an improved process for the isomerization and alkylation of hydrocarbons.

These and other objects of the invention will become more readily apparent from the following detailed description and discussion.

The foregoing objects are realized broadly by contacting hydrocarbons under isomerizing and alkylating conditions with sulfate-treated zirconia-gel catalysts.

In the isomerization reaction, straight chain paraffins, such as butane, pentane, hexane, heptane and higher molecular-weight compounds, are converted to isomers. Also moderately-branched paraffins can be converted to more highly-branched isomers; for example, 2-methylpentane can be converted to 2,2-dimethylbutane. It is also possible to utilize these catalysts in the conversion of naphthenic hydrocarbons having 5, 6, 7 and more carbon atoms in the rings. For example, methylcyclopentane can be converted to cyclohexane, 1,1-dimethylcyclobutane to methylcyclopentane, 1,2-dimethylcyclopentanes to methylcyclohexane, etc. The isomerization reaction is usually carried out at temperatures between about 25° C. and about 400° C., at pressures from 1 atmosphere to 1000 p.s.i. or higher and at liquid hourly space velocities from between about 0.1 to about 20.

The sulfate-treated zirconia gel catalysts can also be employed in the alkylation of saturated branched-chain paraffins, such as isobutane with low boiling olefins like ethylene, propylene, butenes, pentenes, etc. It is also possible to carry out the alkylation of aromatics with olefins, such as the alkylation of benzene with propylene. The alkylation reactions are usually carried out at temperatures in the range of 100 to 400° C., at pressures from atmospheric to about 1000 p.s.i. and space velocities from about 0.1 to about 20.

In one method zirconia gel is prepared by precipitation from a zirconyl salt in a water solution by the addition of a base. Any soluble salt of zirconium can be employed for this purpose including materials such as zirconyl nitrate, zirconyl chloride, zirconyl bromide, zirconyl iodide, etc. Various bases can be used in carrying out precipitation of the gel including ammonium hydroxide, sodium hydroxide, potassium hydroxide, etc. The only limitation in the use of the base is that the salt formed from the cation of the base be soluble in water and thus readily separable from the gel by washing. Usually, it is preferred to employ ammonium hydroxide as the precipitating base since ammonia can be removed from the gel by heating.

Treatment of the zirconia gel with sulfate can be effected in general by any of the procedures which are normally utilized in depositing or adding a catalytic component to a solid. Thus, for example, the gel can be precipitated in a soltuion containing sulfate, or dried gel can be impregnated with sulfate. Various sulfate salts can be employed in adding the sulfate to the gel, including ammonium sulfate, sulfuric acid, zirconyl sulfate, alkali sulfates, such as sodium, potassium and other salts. Usually ammonium sulfate or sulfuric acid is preferred; however, any of the sulfates can be employed if followed by a suitable washing procedure to remove undesirable components of the salt. The treating operation is usually carried out with a solution having a concentration between about 0.05 and about 2.0 molar, and in an amount sufficient to thoroughly cover the gel.

After the sulfate has been added to the gel, the gel can be dried, usually at low temperatures, following which it is heated or activated in dry air at elevated temperatures as high as 550° C. Usually the latter step is carried out over an extended period of time, from 1 hour up to 24 hours in duration. Before the activation step, if desired, the catalyst can be washed one or more times with water or with another washing agent, as necessary to remove undesirable materials introduced to the catalyst during the preparation thereof.

Usually the gel is impregnated with sulfate so that after activation it contains at least 0.05 milliequivalent of sulfate for each gram of gel and preferably from 0.3 to 1.0 milliequivalent of sulfate per gram of gel. The sulfate content can be larger than this but the additional sulfate does not usually give proportional improvements.

Various promoters such as metals and metal oxides of group VIII of the periodic table, e.g., platinum and palladium, can be used with the sulfate-containing catalysts.

When it is desired to add a promoter to the catalyst this can be done by impregnating the catalyst with an aqueous solution of a compound of one of the promoters desired, drying the impregnated gel and heating the dried material. The steps of drying and heating the promoted catalyst are usually carried out under the same conditions as previously set forth for the preparation of the sulfate-containing gel. Impregnating solutions used in preparing the promoted catalyst can be aqueous solutions of, for example, palladium nitrate, chloroplatinic acid, etc. The final catalyst usually contains from 0.1 wt. percent to 5.0 wt. percent of the promoting metal or metal oxide; and the amount is usually from 0.1 to 2 wt. percent promoting metal or metal oxide. It is preferred to use sequential impregnation with the sulfate solution and the additional promoting metal or metal oxide, but impregnations simultaneously with a single solution containing both the sulfate and metallic ions can be used, if desired.

A number of catalysts, representative of the catalysts used in carrying out this invention, were prepared in accordance with the following procedures.

CATALYST I

A solution containing 76 milliliters concentrated ammonium hydroxide in 800 milliliters of water was added to a solution of 152 grams of $ZrO(NO_3)_2 \cdot 2H_2O$ (Fishers C.P.) in 1800 milliliters of water during vigorous stirring (with a dispersator). A gel-like precipitate formed at once at a pH of 8.4. After stirring for 30 minutes, the gel was aged on a steam bath for 1½ hours, then drained on a Buchner funnel and excess liquid was removed by suction. The gel was dried slowly under heat lamps and then in an oven, at 110° C. and finally at 140° C. The gel was washed with water 10 times by decantation and dried at 110° C. Addition of sulfate was accomplished by impregnation with a 0.4-molar solution of ammonium sulfate, using a volume 50 percent greater than that of the dry gel. After removal of excess liquid the catalyst was dried and heat treated in dry air at 500° C. for 5 hours. This yielded a material with a surface area of about 100 square meters per gram and a protonic acidity of about 0.56 meq. per gram.

CATALYST II

This catalyst was prepared according to the same method as catalyst I except that the solution of ammonium sulfate used in impregnating the gel was 1.6-molar instead of 0.4-molar.

CATALYST III 20 milliliters of a sulfate treated gel prepared in the manner of catalyst I was contacted with 30 milliliters of a 0.2-molar palladium nitrate solution for 15 minutes. After removal of excess liquid and drying at 110° C. the catalyst was heat treated at 500° C. for 5 hours in air. On the basis of the solution absorbed the palladium content (present as palladium oxide) was calculated to be 0.9 percent.

CATALYST IV

This catalyst was prepared by the same method used in the preparation of catalyst III, except that 50 milliliters of a solution of platinum chloride containing 0.33 gram of platinum was used to contact 48 milliliters (49.8 grams) of gel. The calculated platinum content (present as platinum oxide) was 0.2 percent.

Example 1

Catalyst II was utilized in the alkylation of isobutane with ethylene. The conditions employed in carrying out the tests and the results obtained are presented in Table I.

TABLE I

| | | |
|---|---|---|
| Temperature, C | 150 | 225 |
| Pressure | Atmospheric | Atmospheric |
| Ethylene, GHSV | 100 | 100 |
| Isobutane, GHSV | 500 | 500 |
| Test Duration, minutes | 50 | 60 |
| Product Composition (weight percent): | | |
| Ethylene | | 1.2 |
| Propane | | 1.3 |
| i-Butane | 95.6 | 85.2 |
| n-Butane | | 5.2 |
| i-Pentane | 3.0 | 4.8 |
| n-Pentane | 0.1 | 0.5 |
| 2-Methyl pentane | 1.0 | 1.1 |
| 3-Methyl pentane | 0.3 | 0.5 |
| n-Hexane | | 0.14 |

Example 2

Methylcyclopentane was isomerized at one atmosphere pressure in the presence of catalyst I. The conditions under which the test was carried out and the results obtained are shown in Table II.

TABLE II

| | | |
|---|---|---|
| Temperature, C | 162 | 154 |
| LHSV | 1.2 | 1.06 |
| Hydrogen, GHSV | None | 200 |
| Test Duration, hour | 1 | 1 |
| Product Composition (Wt. Percent): | | |
| Benzene | 1.00 | Trace |
| Cyclohexane | 5.60 | 4.87 |
| Methylcyclopentane | 93.00 | 94.78 |
| n-Hexane | 0.20 | 0.33 |
| 2-Methylpentane | | 0.02 |
| 3-Methylpentane | | |
| Isopentane | Trace | |
| C₃ and C₄ | (¹) | (¹) |
| Conversion | 7.00 | 5.22 |

¹ Not reported.

From the data above it is apparent that the promoted catalyst employed is active in the conversion of methylcyclopentane to cyclohexane.

Example 3

Normal pentane was isomerized over sulfate-treated zirconia gels promoted with platinum and palladium. The conditions employed and the results obtained are set forth in Table III, along with a similar test utilizing a commercial isomerization catalyst.

TABLE III

| | UOP Penex | IV | III |
|---|---|---|---|
| Temp. (Avg.), C | 380 | 261 | 263 |
| LHSV | 4.1 | 3.9 | 4.0 |
| Pressure (p.s.i.g.) | 500 | 500 | 500 |
| H₂/HC | 2.1 | 2.5 | 2.0 |
| Product Composition, Wt. Percent: | | | |
| $C_1$ | 0.15 | 0.07 | 0.04 |
| $C_2$ | 0.29 | 0.15 | 0.10 |
| $C_3$ | 0.49 | 0.47 | 0.41 |
| $i-C_4$ | Trace | 0.47 | 0.23 |
| $n-C_4$ | 0.50 | 0.87 | 0.40 |
| $i-C_5$ | 57.45 | 57.55 | 23.80 |
| $n-C_5$ | 41.11 | 40.42 | 75.01 |
| Total | 99.99 | 100.00 | 99.99 |
| Conversion | 58.89 | 59.58 | 24.99 |
| Isopentane, yield/pass (LV Percent) | 58.12 | 58.22 | 24.08 |
| Isopentane, ult. yield (LV Percent) | 98.69 | 97.71 | 96.35 |

The data presented in the above table show that the promoted sulfate-treated catalysts are active for the isomerization of normal paraffins. The results obtained utilizing the platinum promoted catalyst are comparative with those obtained with the commercial catalyst.

Having thus described the invention by providing specific examples thereof, it is to be understood that no undue limitations or restrictions are to be drawn by reason thereof and that many variations and modifications are within the scope of the invention.

We claim:

1. The process of isomerizing hydrocarbons selected from the group consisting of normal-butane and normal-pentane which comprises contacting said hydrocarbon with a catalyst consisting essentially of a sulfate-treated zirconia-gel at a temperature between about 25 and about 400° C. and a pressure from atmospheric to about 1000 p.s.i. and at a space velocity of between about 0.1 and about 20.

2. The process of claim 1 wherein said catalyst is promoted with platinum.

3. The process of claim 1 wherein said catalyst is promoted with palladium.

4. The process of alkylating paraffin hydrocarbons with ethylene which comprises contacting said hydrocarbons and ethylene with a catalyst consisting of sulfate-treated zirconia-gel at a temperature between about 100 and about 400° C. and a pressure from atmospheric to about 1000 p.s.i. and at a space velocity between about 0.1 and about 20.

5. The process of claim 4 wherein said paraffin hydrocarbon is isobutane.

References Cited in the file of this patent

UNITED STATES PATENTS

| | | |
|---|---|---|
| 2,401,865 | Gorin et al. | June 11, 1946 |
| 2,467,089 | Marisic et al. | Apr. 12, 1949 |
| 2,748,062 | Doumani | May 29, 1956 |
| 2,834,923 | Patton et al. | May 13, 1958 |

OTHER REFERENCES

Nielsen et al.: U.S. Bureau of Mines, Reports of Investigations, No. 5214, 14 pages (only pages 3 and 9–12 needed), 1956.